US010571092B2

United States Patent
Hoeflinger et al.

(10) Patent No.: US 10,571,092 B2
(45) Date of Patent: Feb. 25, 2020

(54) OPTOELECTRONIC MODULE HAVING AN OLED AND METHOD FOR PRODUCING AN OPTOELECTRONIC MODULE

(71) Applicant: OSRAM OLED GmbH, Regensburg (DE)

(72) Inventors: Benjamin Claus Hoeflinger, Regensburg (DE); Simon Schicktanz, Regensburg (DE)

(73) Assignee: OSRAM OLED GMBH, Regensburg (DE)

( * ) Notice: Subject to any disclaimer, the term of this patent is extended or adjusted under 35 U.S.C. 154(b) by 52 days.

(21) Appl. No.: 15/767,348

(22) PCT Filed: Oct. 6, 2016

(86) PCT No.: PCT/EP2016/073886
§ 371 (c)(1),
(2) Date: Apr. 10, 2018

(87) PCT Pub. No.: WO2017/063940
PCT Pub. Date: Apr. 20, 2017

(65) Prior Publication Data
US 2018/0299091 A1    Oct. 18, 2018

(30) Foreign Application Priority Data
Oct. 14, 2015   (DE) .......... 10 2015 117 487

(51) Int. Cl.
*F21V 21/00*   (2006.01)
*F21S 43/145*   (2018.01)
(Continued)

(52) U.S. Cl.
CPC .......... *F21S 43/145* (2018.01); *B60Q 1/2615* (2013.01); *B60Q 1/2626* (2013.01);
(Continued)

(58) Field of Classification Search
CPC ........ F21S 43/145; F21S 43/19; F21S 43/195; B60Q 3/745; B60Q 1/2615; B60Q 1/2626
(Continued)

(56) References Cited

U.S. PATENT DOCUMENTS 10,295,140 B2 *   5/2019   Ito ........................... F21S 43/13
2009/0073709 A1   3/2009   Yajima et al.
(Continued)

FOREIGN PATENT DOCUMENTS

DE   102007023958 A1   11/2008
DE   112010001807 T5    6/2012
(Continued)

OTHER PUBLICATIONS

"BMW OLED taillights: Video explains new lighting technology" http://www.bimmertoday.de/2015/04/13/bmw-oled-ruckleuchtenvideo-erklart-neue-lichttechnik/; Apr. 13, 2015; 6 pages.
(Continued)

*Primary Examiner* — Laura K Tso
(74) *Attorney, Agent, or Firm* — McDermott Will & Emery LLP

(57) ABSTRACT

The invention relates to an optoelectronic module, comprising a housing (11) having a first housing part (11) having a first cover surface (11a) and an opening (4); a mechanically flexibly designed organic light source (2) having an illuminating surface (2a); and a cover element (3) which is mounted on the illuminating surface (2a) and has a light-transmissive surface (3a) facing away from the illuminating surface (2a), wherein the organic light source (2) is introduced at least at some points into the opening (14), the first cover surface (11a) is curved and/or bowed, the size of the illuminating surface (2a) is at least 1 cm2, preferably at least
(Continued)

5 cm2, and the distance between the illuminating surface (2a) and the first cover surface (11a) is at most 1 cm, preferably at most 5 mm.

19 Claims, 2 Drawing Sheets

(51) Int. Cl.
    *B60Q 1/26*     (2006.01)
    *F21S 43/19*     (2018.01)
    *B60Q 3/74*     (2017.01)
    *F21Y 115/10*     (2016.01)

(52) U.S. Cl.
    CPC .............. *B60Q 3/745* (2017.02); *F21S 43/19* (2018.01); *F21S 43/195* (2018.01); *F21Y 2115/10* (2016.08)

(58) Field of Classification Search
    USPC .......................................... 362/487, 509, 84
    See application file for complete search history.

(56) References Cited

U.S. PATENT DOCUMENTS

2013/0279187 A1* 10/2013 Wang ................... B60Q 1/2626
    362/487
2014/0140081 A1* 5/2014 Takahashi ............ B60Q 1/2665
    362/509
2014/0247614 A1* 9/2014 Roberts ................ B60Q 1/2615
    362/509
2015/0280152 A1 10/2015 Iwagaki et al.

FOREIGN PATENT DOCUMENTS

| DE | 102012223362 A1 | 6/2013 |
| DE | 102013225796 A1 | 6/2015 |
| DE | 102015205896 A1 | 10/2015 |
| EP | 2592331 A1 | 5/2013 |
| GB | 2405755 A | 3/2005 |
| JP | 2014-219508 A | 11/2014 |
| WO | 2014/156668 A1 | 10/2014 |

OTHER PUBLICATIONS

"Lighting : Audi with three-dimensional OLED tail light" https://www.golem.de/news/beleuchtung-audi-mitdreidimensionalem-oledruecklicht-1307100350.html; Jul. 12, 2013; 9 pages.

"AutoMotorTech; Auto light: Osram shows OLED taillights at Theo Light + Building" http://www.techfieber.de/motor/2014/03/31/automotortech-autolicht-osram-zeigt-oledrueckleuchten-bei-derlightbuilding/; Mar. 31, 2014; 9 pages.

* cited by examiner

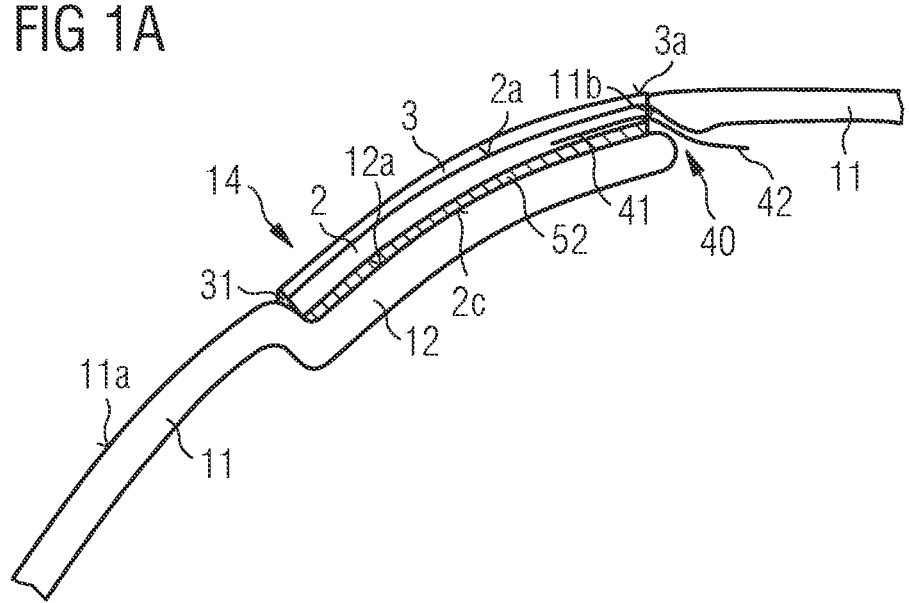
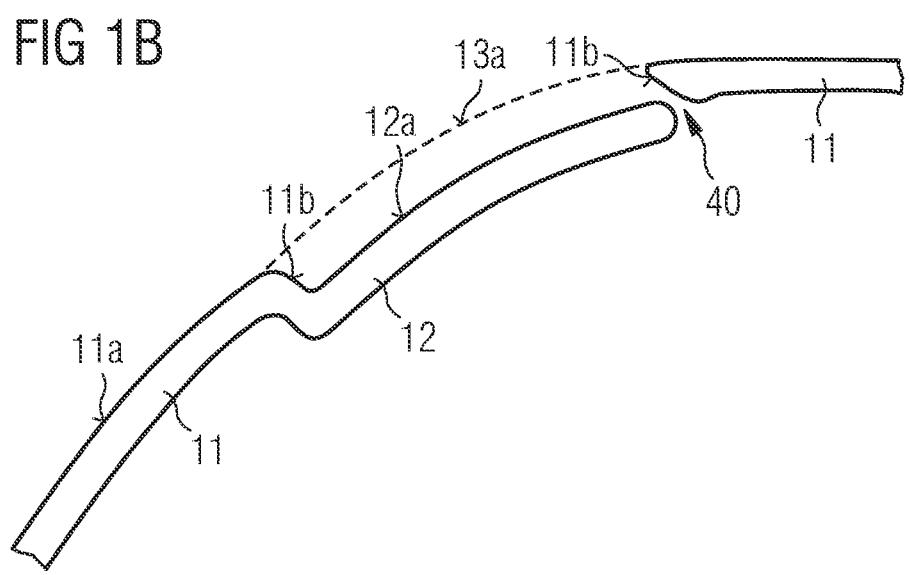

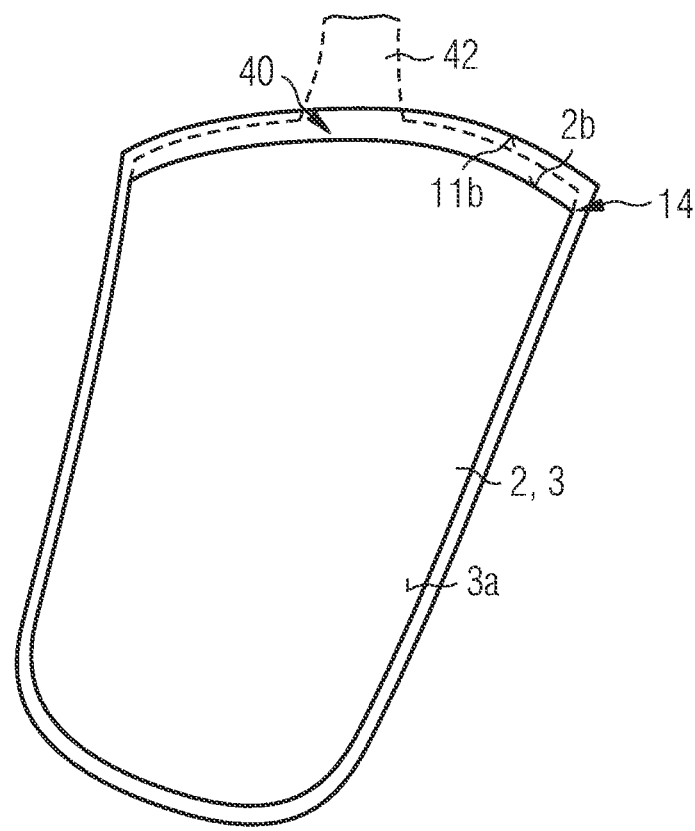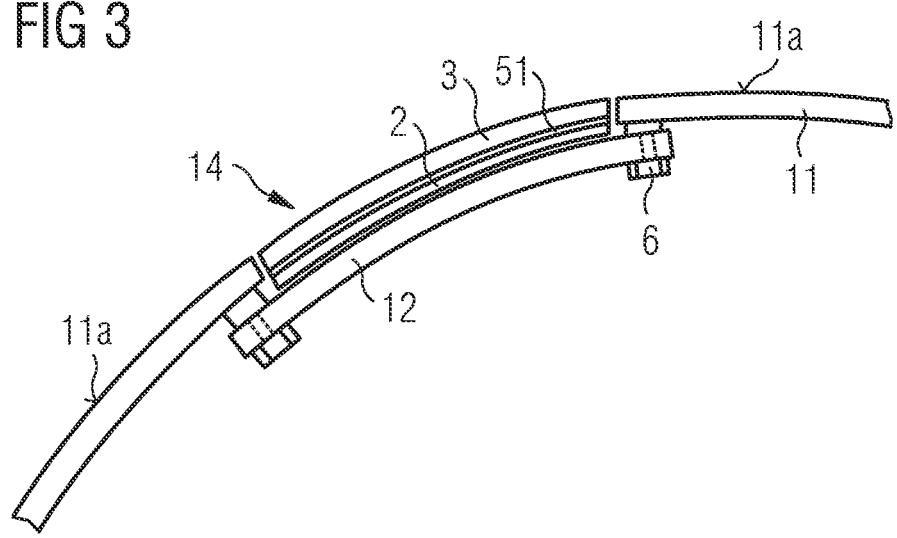

OPTOELECTRONIC MODULE HAVING AN OLED AND METHOD FOR PRODUCING AN OPTOELECTRONIC MODULE

CROSS-REFERENCE OF RELATED APPLICATIONS

This application is the U.S. National Phase under 35 U.S.C. § 371 of International Patent Application No. PCT/EP2016/073886, filed on Oct. 6, 2016, which in turn claims the benefit of German Application No. 10 2015 117 487.1, filed on Oct. 14, 2015 the entire disclosures of which Applications are incorporated by reference herein.

An optoelectronic module and a method for producing an optoelectronic module are provided.

One object to be solved is to provide a space-saving optoelectronic module. One further object to be solved is to provide a method for producing a space-saving optoelectronic module.

An optoelectronic module is provided. The optoelectronic module can be a lighting means. For example, the optoelectronic module is an outside lighting and/or a motor vehicle lighting.

According to at least one embodiment of the optoelectronic module, the module comprises a housing. The housing has a first housing part which comprises a first cover surface and an opening. The opening can penetrate throughout the first housing part. In other words, the opening can be a hole and/or a through-hole and/or a blind hole in the first housing part. It is possible for the first cover surface to be formed in a multifold contiguous manner. The first cover surface can form an exterior surface of the first housing part and/or of the housing which is in particular exposed and freely accessible from the outside.

According to at least one embodiment of the optoelectronic module, the module comprises an organic light source being formed in a mechanically flexible manner and having an illuminating surface. Here and in the following, a component of the optoelectronic module is formed to be "mechanically flexible" when the component can be bent in a non-destructive manner around at least one first axis at a radius of curvature which is at least 50 times, preferably at least 10 times the extent of the component along a further axis.

The organic light source can be an organic light emitting diode. The organic light source can comprise an organic layer stack having an active layer, a cathode and an anode for electrical contacting purposes and a thin film encapsulation. In particular, the organic light source emits visible light during operation. The light can be emitted through the illuminating surface.

The housing can be formed as a mechanically stabilizing and/or protective component of the organic light source. In particular, the housing can be rigid at least in places. Here and in the following, "mechanically stabilizing" can mean that the housing serves for mechanically fastening and/or mounting the organic light source. In addition, the housing can serve to secure the organic light source against shifting. Furthermore, "protecting" can mean that the housing protects the organic light source against environmental influences and/or mechanical destruction. The housing can be formed from a metal or a plastic, for example from a carbon-fiber-reinforced plastic.

According to at least one embodiment of the optoelectronic module, the module comprises a cover element. The cover element is applied to the illuminating surface and has a light passage surface which faces away from the illuminating surface and is in particular freely accessible from the outside. The cover element can be mounted inside the opening and can directly adjoin the first housing part at least in places. In particular, the illuminating surface can be completely covered by the cover element. In other words, the light passage surface is formed to be at least as large as the illuminating surface. It is possible for the cover element to protect the organic light source from, in particular mechanical and/or chemical, environmental influences.

The cover element can be at least partially transparent. Here and in the following, a component of the optoelectronic module is said to "be transparent" if it has a transmission coefficient of at least 50%, preferably at least 70% and particularly preferably at least 80% with respect to the light emitted by the light source. Thus, it is possible that the light emitted by the organic light source at least partially passes through the cover element and is coupled out into the surroundings at the light passage surface. For example, the cover element is formed from a plastic or a glass or consists of at least one of these materials. In particular, the entire cover element can be transparent.

Alternatively or additionally, a part of the cover element can be formed to be radiation-opaque. Here and in the following, a component of the optoelectronic module is "radiation-opaque" if it has a transmission coefficient of at most 50%, preferably at most 30% and particularly preferably at most 20% with regard to light emitted by the light source. For example, the radiation-opaque part of the cover element is formed to be radiation-absorbing and/or reflecting. The radiation-opaque part of the cover element can act, for example, as a diaphragm and/or cover a non-illuminating edge region of the organic light source. Alternatively or additionally, it is possible for the entire cover element to be tinted and/or pigmented.

Furthermore, the cover element can be formed to be radiation-opaque to UV radiation. In other words, at least 60%, preferably at least 70% and particularly preferred at least 80%, of an incident UV radiation on the cover element are absorbed and/or reflected by the cover element. In this way, protection of the organic light source against UV radiation can be achieved. The UV radiation can impinge on the cover element, in particular from the outside, that is to say from the side having the light passage surface.

A connecting means can be provided between the cover element and the illuminating surface and can directly adjoin the illuminating surface and the cover element. The connecting means can be an adhesive, such as a pressure-sensitive adhesive (PSA), or a potting, such as, for example, a silicone and/or epoxy resin potting.

According to at least one embodiment of the optoelectronic module, the organic light source is applied into the opening at least in places. In other words, the organic light source is arranged within the opening. In particular, it is possible for the organic light source to be overtopped at least in places by the first housing part along a stacking direction running transversely and/or perpendicularly to the first cover surface.

According to at least one embodiment of the optoelectronic module, the first cover surface is formed to be curved and/or arched. In other words, a mathematical function describing the first cover surface can be continuously differentiable twice. For example, in at least one cross section, the first cover surface has the shape of a parabola at least in places. The first cover surface can in particular be convexly curved. In other words, the first cover surface can be curved outwards. Here and in the following, the directions "outside"

and "inside" and the direction-related information "convex" and "concave" can be applied to the first cover surface being an exterior surface.

According to at least one embodiment of the optoelectronic module, a size of the illuminating surface of the organic light source is at least 1 cm$^2$, preferably at least 5 cm$^2$. In other words, the organic light source can be a surface light source.

According to at least one embodiment of the optoelectronic module, a distance between the illuminating surface and the first cover surface is at most 1 cm, preferably at most 5 mm. The distance between the illuminating surface and the first cover surface can in particular be the greatest distance between the illuminating surface and the first cover surface along the stacking direction. In other words, for a distance between the illuminating surface and/or the first cover surface varying along the illuminating surface and/or the first cover surface, the distance is the largest distance.

In particular, the distance can essentially correspond to the thickness of the cover element. "Substantially" means in this context that the thickness of the cover element corresponds to at least 80%, preferably at least 90% of the distance between the illuminating surface and the first cover surface, wherein the remaining amounts are at most 20%, preferably at most 10% of the distance given by production tolerances and/or of the extension of an optional connecting means arranged between the cover element and illuminating surface.

According to at least one embodiment of the optoelectronic module, the module comprises a housing, which comprises a first housing part having a first cover surface and an opening, a mechanically flexible organic light source having an illuminating surface and a cover element applied to the illuminating surface, comprising a light passage surface facing away from the illuminating surface. The light source is introduced into the opening at least in places, and the first cover surface is curved and/or arched. A size of the illuminating surface of the organic light source is at least 1 cm$^2$, preferably at least 5 cm$^2$ and a distance between the illuminating surface and the first cover surface is at most 1 cm, preferably at most 5 mm.

In connection with the optoelectronic module described here, the idea to be pursued is, in particular, to provide a space-saving lighting means. Using a cover element, the organic light source of the optoelectronic module is protected, in particular, against environmental influences such as radiation influences and/or staining, and/or against mechanical influences.

According to at least one embodiment of the optoelectronic module, the illuminating surface and/or the light passage surface follow/follows along with a continued contour of the first cover surface at least in regions. Here and in the following, the "continued contour" can be given by a further surface which complements the first cover surface in the region of the opening in such a way that the first cover surface and the further surface together are formed in a onefold-contiguous manner. In particular, the continued contour can be formed in such a way that the first cover surface and the continued contour together form a uniform curvature and/or bending. Furthermore, here and in the following, a first surface of the continued contour can "follow" a second surface "at least in regions" if at least 70%, preferably at least 80% and particularly preferably at least 90%, of the first surface run parallel to or along the continued contour and/or have the same curvature as the continued contour. Furthermore, here and in the following, the curved and/or bending surfaces are "parallel" when the normal vectors of the surfaces run parallel to one another. In other words, in the case of a first surface "following" a continued contour of a second surface "at least in regions", at least 70%, preferably at least 80% and particularly preferably at least 90%, of the normal vectors of the first surface can run parallel to the normal vectors of the continued contour.

It is possible for the continued contour of the first cover surface to be the light passage surface at least in regions. In particular, the first cover surface can be flush with the light passage surface at least in places. Furthermore, it is possible that the light passage surface and the illuminating surface have the same curvature and/or run parallel to one another.

According to at least one embodiment of the optoelectronic module, the housing comprises a second housing part having a second cover surface. The second housing part is arranged at the opening at a lower side of the first housing part facing away from the first cover surface and at least partially covers the opening. For example, in a plan view of the lower side, at least 80% of the opening are covered by the second housing part. The second housing part can be made of the same material as the first housing part or consist of the same material.

According to at least one embodiment of the optoelectronic module, the organic light source is arranged on the second cover surface of the second housing part. In this case, it is possible that a further connecting means, for example a pressure-sensitive adhesive, is arranged between the organic light source and the second cover surface. Moreover, at least in some regions, further components of the optoelectronic module, such as a circuit board, can be arranged between the organic light source and the second cover surface. In particular, the second housing part can act as a mechanically stabilizing carrier for the organic light source.

According to at least one embodiment of the optoelectronic module, the second cover surface follows the continued contour of the first cover surface at least in regions. The second cover surface can be formed parallel to the illuminating surface and/or to the light passage surface. In particular, the second cover surface can have the same curvature as the illuminating surface and/or the light passage surface.

According to at least one embodiment of the optoelectronic module, the housing has a second housing part comprising a second cover surface, wherein the second housing part is arranged at the opening at a lower side of the first housing part facing away from the first cover surface and covers the opening, the organic light source is arranged on the second cover surface and the second cover surface follows the continued contour of the first cover surface at least in regions.

The first and the second housing part can be connected to one another in a vibration-stable manner. In other words, vibrations generated by a movement compliant to the application purpose of the optoelectronic module do not lead to a separation and/or detachment of the first and second housing parts from each other.

According to at least one embodiment of the optoelectronic module, the first housing part and the second housing part are formed in one piece. Here and in the following, two components are formed "in one piece" when they are formed from one piece and in particular no interfaces are arranged between the two components. In other words, the first housing part and the second housing part are formed in a contiguous manner. Due to the one-piece design, the housing can be particularly vibration-stable.

According to at least one embodiment of the optoelectronic module, the module comprises a mechanically flexible circuit board, such as a printed circuit board (PCB). The circuit board has a first region and a second region. The first region is arranged in places at a mounting surface of the organic light source facing away from the illuminating surface. In particular, the first region of the circuit board covers the mounting surface at least partially. The first region can be electrically conductively connected to the organic light source and serve for electrically contacting the organic light source.

The first region can be connected to the mounting surface in a positive-substance joining manner. In particular, the first region and the mounting surface can be connected together using an anisotropic conductive adhesive (so-called ACF-bond, ACF: anisotropic conductive film). An anisotropic conductive adhesive is characterized in particular by a highly anisotropic conductivity. In particular, an electrical connection is formed only along the vertical direction, that is to say obliquely and/or perpendicularly to the mounting surface, and not along the mounting surface. In this case, the structuring of the contacts of the first region of the circuit board and/or of the contacts of the organic light source can be avoided. Furthermore, an anisotropic conductive adhesive can be vibration-proof and environmentally stable and is thus suitable for a robust and space-saving optoelectronic module.

According to at least one embodiment of the optoelectronic module, in places in a stacking direction transverse to the first cover surface and/or to the second cover surface, a slot is arranged between the first housing part and the second housing part. The slot can be a blind-hole in the one-piece formed housing. In particular, the slot extends completely through the housing so that the first housing part and the second housing part are not connected to one another at the position of the slot. In other words, due to the slot, the surface assembled by the first and the second cover surfaces is formed in a multifold-contiguous manner.

According to at least one embodiment of the optoelectronic module, the second region of the circuit board is guided through the slot to a lower side of the housing facing away from the first cover surface and/or from the second cover surface. In other words, the second region is threaded through the slot. In particular, the second region extends from the organic light source arranged within the opening to the lower side of the housing. The second region can have connection terminals, by means of which the electrical contacting can be realized.

According to at least one embodiment of the optoelectronic module, the first housing part and the second housing part are formed in one piece. Furthermore, a mechanically flexible circuit board is present. A first region of the circuit board is arranged in places at a mounting surface of the organic light source facing away from the illuminating surface. In places along a stacking direction transverse to the first cover surface and/or to the second cover surface, a slot is arranged between the first housing part and the second housing part, wherein a second region of the circuit board is guided through the slot to a lower side of the housing facing away from the first cover surface and/or the second cover surface.

According to at least one embodiment of the optoelectronic module, the cover element fills at least 80%, preferably at least 90%, of a cross-sectional area of the opening. The cross-sectional area preferably runs perpendicular to the stacking direction. In particular, the cover element can completely fill and/or cover the opening. For example, the cover element adjoins an inner side surface of the first housing part at least in places. The inner side surface can be a side surface of the first housing part arranged within the opening running obliquely and/or perpendicularly to the first cover surface.

According to at least one embodiment of the optoelectronic module, the inner side surface of the first housing part is in direct contact to a side surface of the light source at least in places. In particular, the locations of the side surface of the first housing part, which are in direct contact to the side surface of the light source, can be a mechanical stop serving for the mounting and/or introducing of the organic light source into the housing. For example, the stop is located on the part of the inner side surface of the first housing part on which the second region of the circuit board projects beyond the light source.

According to at least one embodiment of the optoelectronic module, the first housing part and the second housing part are connected together in a mechanically detachable manner. For example, the second housing part is a rigid carrier which is connected to the first housing part by mechanically releasable connecting elements. The connecting elements can be screws or dowel pins. The first housing part and the second housing part can have screw threads and/or bores into which the connecting elements can engage. In particular, the connecting elements can be guided starting from the lower side through the first housing part into the second housing part. A mechanically detachable connection enables a non-destructive exchange of the organic light source.

According to at least one embodiment of the optoelectronic module, the cover element is a foil, for example a PMMA foil (PMMA: polymethyl methacrylate). Alternatively or additionally, the cover element may be formed to be mechanically flexible. The cover element is connected to the first housing part and/or to the second housing part in a positive-substance joining manner. Moreover, the cover element can be connected to the illuminating surface of the organic light source in a positive-substance joining manner. A "positive-substance joining connection" is a connection which cannot be mechanically released in a non-destructive manner, wherein the joint partners are held together by atomic or molecular forces. For example, the connecting means is applied to the cover element. A pressure-sensitive adhesive is particularly suitable as the connecting means in the case of a film and/or a mechanically flexible cover element. In other words, the cover element is adhesively bonded onto the first housing part and/or the second housing part and optionally onto the organic light source.

According to at least one embodiment of the optoelectronic module, the distance between the illuminating surface and the first cover surface is at most 500 µm. In particular, the distance is at least 100 µm. In particular, it is possible that the distance between the illuminating surface and the first cover surface substantially corresponds to the thickness of the cover element.

According to at least one embodiment, the optoelectronic module is void of further housings. In other words, no further components mechanically stabilizing and/or protecting the organic light source are present in the optoelectronic module.

According to at least one embodiment, the optoelectronic module is an exterior lighting of a motor vehicle. For example, the optoelectronic module is a rear light, a brake light, an accent lighting in particular on the exterior of the motor vehicle, and/or an interior lighting of a motor vehicle.

According to at least one embodiment of the optoelectronic module, the housing is part of a vehicle body. In particular, the first housing part is part of a vehicle body. For example, the first cover surface is an outer surface of a motor vehicle.

Moreover, a method for producing an optoelectronic module is provided. The method is preferably suitable for producing an optoelectronic module described here. This means that all the features disclosed in connection with the optoelectronic module are also disclosed for the method and vice versa.

According to at least one embodiment of the method, the housing, the organic light source and the in particular mechanically flexible circuit board are provided. Here, the first region of the circuit board is arranged at the mounting surface of the light source in places.

According to at least one embodiment of the method, the cover element is provided on the illuminating surface of the organic light source, wherein a region of the cover element projects beyond the illuminating surface in lateral directions, that is to say transversely with respect to the stacking direction. In particular, the cover element is connected to the illuminating surface in a positive-substance joining manner. For example, the cover element can be formed as a foil and can be applied to the illuminating surface by foil-lamination. Alternatively, it is possible for the cover element to be a potting which is applied to the illuminating surface by a casting process.

According to at least one embodiment of the method, the second region of the circuit board is inserted into the slot. For example, the second region of the circuit board is threaded through the slot or threaded into the slot. The insertion is carried out in such a way that the side surface of the light source and the inner side surface of the first housing part are in direct contact with one another at least in places. The side surface of the light source and the inner side surface of the first housing part can function as a mechanical stop in this case. This enables, for example, a spatial alignment of the organic light source with respect to the opening of the housing. Here, it is possible that the second region of the circuit board is threaded through the slot in the first place and the light source is then applied at least to the first region of the circuit board.

It is possible for the organic light source to be applied into the opening after the introduction and/or during the introduction of the second region of the circuit board. For example, the organic light source is rolled into the opening by means of a roller laminator.

Furthermore, prior to the introduction of the organic light source, it is possible for a further connecting means to be introduced into the opening onto the second cover surface and/or applied to the mounting surface of the organic light source. For this purpose, the mounting surface, for example, has an adhesive, in particular a pressure-sensitive adhesive, onto which a protective film is applied. Prior to the introduction of the organic light source into the opening, the protective film can be detached and an organic light source can be provided with the mounting surface coated with an adhesive.

According to at least one embodiment of the method, the protruding region of the cover element is connected to the first housing part and/or the second housing part. The connection can be carried out at the same time as the cover element is provided on the illuminating surface and after the introduction of the organic light source into the opening. Alternatively, the cover element can be provided before the organic light source is introduced into the opening at the illuminating surface and can only be connected to the first and/or the second housing part after being introduced.

For example, it is possible for a free space and/or a gap to be arranged between the cover element and the inner side surface of the first housing part, at least at the locations, where the side surface of the organic light source is not in direct contact with the inner side surface of the first housing part. This free space and/or gap can be founded in the fact that, due to the orientation of the organic light source at one part acting as a mechanical stop of the inner side surface of the first housing part, one further part opposite of said one part of the inner side surface can be spaced apart from the organic light source.

BRIEF DESCRIPTION OF THE FIGURES

In the following, the optoelectronic module described here and the method described here are described in more detail on the basis of the embodiments and the associated figures.

FIGS. 1A and 1B show exemplary embodiments of an optoelectronic module described here on the basis of schematic sectional representations.

FIG. 2 shows an exemplary embodiment of an optoelectronic module described here on the basis of a schematic plan view.

FIG. 3 shows an exemplary embodiment of an optoelectronic module described here on the basis of a schematic sectional view.

Identical, equivalent or equivalently acting elements are indicated with the same reference numerals in the figures. The figures and the size ratios of the elements shown in the figures are not necessarily true to scale. Individual elements can rather be illustrated exaggeratedly large for the purpose of better clarification and/or comprehension.

An exemplary embodiment of an optoelectronic module described here is explained in more detail with reference to the schematic sectional representations of FIGS. 1A and 1B. FIG. 1A shows an exemplary embodiment of an optoelectronic module, while FIG. 1B—for the purpose of explanation—only shows the housing associated with the optoelectronic module of FIG. 1A.

The optoelectronic module comprises a housing having a first housing part 11 comprising a first cover surface 11a and a second housing part 12 comprising a second cover surface 12a. The first cover surface 11a and the second cover surface 12a have a convex curvature in the exemplary embodiment as shown. Furthermore, the first housing part 11 and the second housing part 12 are formed in one piece.

In the first housing part 11 there is an opening 14, which extends completely through the first housing part 11 in a stacking direction running obliquely to a thickness of the first housing part 11. An inner side surface 11b, which is arranged in the opening 14, of the first housing part 11 can be formed in a onefold-contiguous manner and frames the opening 14.

Inside the opening 14, a mechanically flexible organic light source 2 having an illuminating surface 2a facing away from the second cover surface 12a and a mounting surface 12c facing the second cover surface 12a is arranged on the second cover surface 12a. The organic light source 2 can be a surface light source, whose illuminating surface 2a can have a size of at least 1 $cm^2$.

The opening 14 can be of flat design. In particular, a distance between the illuminating surface 2a and the first cover surface 11a is at most 1 cm, preferably at most 5 mm.

A cover element 3 having a light passage surface 3a facing away from the illuminating surface 2a is arranged on the illuminating surface 2a of the organic light source 2.

According to the exemplary embodiment shown in FIG. 1A, the cover element 3 is a foil which is adhesively bonded onto the illuminating surface 2a by means of a connecting means 51 (not shown in FIG. 1A), which can be a pressure-sensitive adhesive.

The cover element 3 also has a protruding region 31 which projects laterally beyond the illuminating surface 2a. The protruding region 31 of the cover element 3 can be connected to the first housing part 11 and/or the second housing part 12 in regions by the connecting means 51.

Furthermore, a slot 40 is arranged between the first housing part 11 and the second housing part 12. In the stacking direction, the slot 40 has a smaller extension than the first housing part 11 and/or the second housing part 12. The slot 40 can in particular be a gap or a joint between the first housing part 11 and the second housing part 12.

A first region 41 of a mechanically flexible circuit board is arranged at the mounting surface 2c of the organic light source 2. The circuit board merges into a second region 42, which is guided through the slot 40 to a lower side of the housing facing away from the first cover surface 11a and/or from the second cover surface 12a. In this case, it is possible that the second region 42 is introduced into the slot 40 in the first place during the production of the optoelectronic module and subsequently, the organic light source 2 located on the first region 41 is connected to the housing by the cover element 3 and/or a further connecting means 52.

A further connecting means 52 can also be arranged between the second cover surface 12a and the mounting surface 2c, which can be, for example, an adhesive and/or a potting.

The illuminating surface 2a and/or the light passage surface 3a are formed to be curved and/or bent. The illuminating surface 2a and the light passage surface 3a follow a continued contour 13a (see FIG. 1B) of the first cover surface 11a at least in regions. In particular, at least in places, the illuminating surface 2a and/or the light passage surface 3a can have the same curvature as the continued contour 13a of the first cover surface 11a.

For the purpose of clarification, FIG. 1B shows only the first housing part 11 and the second housing part 12, wherein the continued contour 13a of the first cover surface 11a is indicated. In particular, the continued contour 13a is provided by a further surface which complements the first cover surface 11a in the region of the opening 14 to a onefold-contiguous surface.

With reference to the plan view of the light passage surface 3a as shown in FIG. 2, a further exemplary embodiment of the optoelectronic module described here is explained in more detail. The organic light source 2 is introduced into the opening 14 within the first housing part 11. In this case, a side surface 2b of the organic light source 2 directly adjoins the inner side surface 11b of the first housing part 11 at least in places. In particular, the inner side surface 11b and the side surface 2b of the organic light source 2 serve as a stop for mounting the organic light source 2 within the opening 14.

A further exemplary embodiment of an optoelectronic module described here is explained in more detail with reference to the schematic sectional illustration of FIG. 3. In the exemplary embodiment as shown, the first housing part 11 and the second housing part 12 are formed from two separate parts and are connected to one another by connecting elements 6 in a mechanically detachable manner. The connecting elements 6 can be screws which engage in the bores of the first housing part 11 and/or in the second housing part 12.

The priority of the German patent application DE 10 2015 117 487.1 is claimed, whose disclosure content is hereby included by reference.

The invention is not restricted to the exemplary embodiments by the description made with reference to exemplary embodiments. The invention rather comprises any novel feature and any combination of features, including in particular any combination of features in the patent claims, even if this feature or this combination is not itself explicitly indicated in the patent claims or exemplary embodiments.

LIST OF REFERENCE SIGNS 11 first housing part
11a first cover surface
11b inner side surface
12 Second housing part
12a second cover surface
13a continued contour
14 opening
2 organic light source
2a illuminating surface
2b side surface of the organic light source
2c mounting surface
3 cover element
3a light passage surface
40 slot
41 first region of the circuit board
42 second region of the circuit board
51 connecting means
52 further connection means
6 connector element

The invention claimed is:

1. An optoelectronic module comprising:
a housing having a first housing part comprising a first cover surface and an opening,
an organic light source formed in a mechanically flexible manner and having an illuminating surface, and
a cover element being applied to the illuminating surface and comprising a light passage surface opposite from the illuminating surface, wherein
the organic light source is introduced into the opening,
the first cover surface is curved or arched,
a size of the illuminating surface is at least 1 cm$^2$ and
a distance between the illuminating surface and the first cover surface is at most 1 cm.

2. The optoelectronic module according to claim 1, wherein the housing comprises a second housing part having a second cover surface, wherein
the second housing part is arranged at the opening at a lower side of the first housing part opposite from the first cover surface and covers the opening,
the organic light source is arranged on the second cover surface, and
the first housing part and the second housing part are formed in one piece and have a slot extending completely through the housing for guiding a circuit board to a lower side of the housing opposite from the second cover surface.

3. The optoelectronic module according to claim 1, in which the housing comprises a second housing part having a second cover surface, wherein
the second housing part is arranged at the opening at a lower side of the first housing part opposite from the first cover surface and covers the opening,
the organic light source is arranged on the second cover surface, and the first housing part and the second housing part are connected to one another in a mechanically detachable manner.

4. The optoelectronic module according to claim 1, wherein the illuminating surface or the light passage surface follow a continued contour of the first cover surface.

5. The optoelectronic module according to claim 1, in which the housing has a second housing part having a second cover surface, wherein
- the second housing part is arranged at the opening at a lower side of the first housing part opposite from the first cover surface and covers the opening,
- the organic light source is arranged on the second cover surface, and
- the second cover surface follows the continued contour of the first cover surface.

6. The optoelectronic module according to claim 5 having a circuit board being formed in a mechanically flexible manner, in which the first housing part and the second housing part are formed in one piece, wherein
- a first region of the circuit board is arranged at a mounting surface of the organic light source opposite from the illuminating surface,
- in a stacking direction transverse to the first cover surface or to the second cover surface, a slot is arranged between the first housing part and the second housing part, and
- a second region of the circuit board is guided through the slot to a lower side of the housing opposite from the first cover surface or from the second cover surface.

7. The optoelectronic module according to claim 1, wherein the cover element fills at least 80% of a cross-sectional area of the opening.

8. The optoelectronic module according to claim 1, wherein an inner side surface of the first housing part is in direct contact with a side surface of the organic light source.

9. The optoelectronic module according to claim 1, wherein the first housing part and the second housing part are connected to one another in a mechanically detachable manner.

10. The optoelectronic module according to claim 1, wherein the cover element is a foil or formed to be mechanically flexible and the cover element is connected to the first housing part or the second housing part in a firmly bonded manner.

11. The optoelectronic module according to claim 1, wherein the distance between the illuminating surface and the first cover surface is at most 500 µm.

12. The optoelectronic module according to claim 1, which is free of any further housings.

13. The optoelectronic module according to claim 1, which is an exterior lighting of a motor vehicle.

14. The optoelectronic module according to claim 1, wherein the housing is part of a vehicle body.

15. A method for producing an optoelectronic module comprising:
- a housing having a first housing part comprising a first cover surface and an opening;
- an organic light source formed in a mechanically flexible manner and having an illuminating surface; and
- a cover element being applied to the illuminating surface and comprising a light passage surface opposite from the illuminating surface, wherein
- the organic light source is introduced into the opening,
- the first cover surface is curved or arched,
- a size of the illuminating surface is at least 1 cm$^2$,
- a distance between the illuminating surface and the first cover surface is at most 1 cm,
- the housing comprises a second housing part having a second cover surface, and
- in a stacking direction transverse to the first cover surface or to the second cover surface, a slot is arranged between the first housing part and the second housing part, and wherein the method comprises the following steps:
- providing the housing having the first housing part and the second housing part, the organic light source and the circuit board, wherein the first region of the circuit board is arranged at the mounting surface of the light source,
- providing the cover element on the illuminating surface, wherein the cover element comprises a protruding region,
- inserting the second region of the circuit board into the slot such that the side surface of the organic light source and the inner side surface of the first housing part are in direct contact with one another and act as a stop, and
- connecting the protruding region of the cover element to the first housing part or the second housing part.

16. The optoelectronic module according to claim 1, in which the housing has a second housing part having a second cover surface, wherein
- the second housing part is arranged at the opening at a lower side of the first housing part opposite from the first cover surface and covers the opening,
- the organic light source is arranged on the second cover surface following a continued contour of the first cover surface,
- the first housing part and the second housing part are formed in one piece, and
- a circuit board is formed in a mechanically flexible manner and has a first region and a second region,
- a slot is arranged between the first housing part and the second housing part, and
- the second region of the circuit board is guided through the slot to a lower side of the housing opposite from the first cover surface or from the second cover surface.

17. The optoelectronic module according to claim 1, in which the housing has a second housing part having a second cover surface, wherein
- the second housing part is arranged at the opening at a lower side of the first housing part opposite from the first cover surface and covers the opening,
- the organic light source is arranged on the second cover surface, and
- the first housing part and the second housing part are connected to one another in a mechanically detachable manner by mechanically releasable connecting elements.

18. An optoelectronic module comprising:
- a housing having a first housing part comprising a first cover surface and an opening;
- an organic light source formed in a mechanically flexible manner and having an illuminating surface; and
- a cover element being applied to the illuminating surface and comprising a light passage surface opposite from the illuminating surface, wherein
- the organic light source is introduced into the opening,
- the first cover surface is curved or arched,
- the housing comprises a second housing part having a second cover surface, wherein the second housing part is arranged at the opening and covers the opening, the organic light source is arranged on the second cover surface, and the first housing part and the second housing part are formed in one piece and have a slot extending completely through the housing for guiding a circuit board to a lower side of the housing opposite from the second cover surface.

19. The optoelectronic module according to claim 18, wherein a size of the illuminating surface is at least 1 cm$^2$ and a distance between the illuminating surface and the first cover surface is at most 1 cm.

* * * * *